(12) United States Patent
Heidenreich et al.

(10) Patent No.: US 9,097,239 B2
(45) Date of Patent: Aug. 4, 2015

(54) WIND TURBINE TORQUE LIMITING CLUTCH SYSTEM

(75) Inventors: David C. Heidenreich, Akron, OH (US); Richard E. Cole, Jr., LaGrange, OH (US)

(73) Assignee: EBO Group, Inc., Sharon Center, OH (US)

( * ) Notice: Subject to any disclaimer, the term of this patent is extended or adjusted under 35 U.S.C. 154(b) by 672 days.

(21) Appl. No.: 13/454,378

(22) Filed: Apr. 24, 2012

(65) Prior Publication Data

US 2012/0201679 A1 Aug. 9, 2012

Related U.S. Application Data

(63) Continuation-in-part of application No. 12/858,688, filed on Aug. 18, 2010, now Pat. No. 8,932,017.

(51) Int. Cl.
| | |
|---|---|
| *F03D 11/00* | (2006.01) |
| *F16D 45/00* | (2006.01) |
| *F16D 47/02* | (2006.01) |
| *F16D 47/04* | (2006.01) |
| *F03D 11/02* | (2006.01) |

(52) U.S. Cl.
CPC ......... *F03D 11/02* (2013.01); *F05B 2260/4023* (2013.01); *F05B 2260/80* (2013.01); *F05B 2270/335* (2013.01); *Y02E 10/722* (2013.01)

(58) Field of Classification Search
CPC ....... F16D 7/025; F16D 7/027; F16D 43/215; F16D 45/216; F16D 45/00; F16D 47/02; F16D 47/04; F16D 41/067

USPC ................ 192/48.4, 48.92, 55.1; 416/146 R; 464/46

See application file for complete search history.

(56) References Cited

U.S. PATENT DOCUMENTS

| | | | | |
|---|---|---|---|---|
| 3,072,234 | A * | 1/1963 | Maurice et al. ............. | 192/48.3 |
| 3,249,187 | A * | 5/1966 | McDowall ................... | 192/48.5 |
| 3,251,442 | A * | 5/1966 | Aschauer .................... | 192/48.3 |
| 3,319,751 | A * | 5/1967 | Sacchini ..................... | 192/48.3 |
| 3,680,673 | A * | 8/1972 | Webb .......................... | 192/41 R |
| 4,425,989 | A * | 1/1984 | Gotoda ....................... | 192/48.92 |
| 5,183,139 | A * | 2/1993 | Malecha .................. | 192/45.008 |
| 2012/0045335 | A1 * | 2/2012 | Heidenreich et al. ..... | 416/170 R |

* cited by examiner

*Primary Examiner* — Robert Hodge
*Assistant Examiner* — Tinh Dang
(74) *Attorney, Agent, or Firm* — Renner, Kenner, Greive, Bobak, Taylor & Weber Co., L.P.A.

(57) ABSTRACT

An asymmetric torque limiting coupling system for use on wind turbines, in which a forward torque limiting clutch and a reverse torque limiting clutch are provided in paired relation, with the reverse torque limiting clutch having a characteristic slip torque that is significantly less than that of the forward torque limiting clutch. In a specific embodiment disclosed, an asymmetric torque limiter interconnects a wind turbine with a generator shaft. The coupling includes an input housing and an output hub, with an overrunning mechanism interposed between the two. A first torque limiting mechanism is provided in series interconnection with the overrunning mechanism between the input housing and hub, while a second torque limiting mechanism is provided in parallel interconnection with the overrunning mechanism between the input housing and output hub.

14 Claims, 3 Drawing Sheets

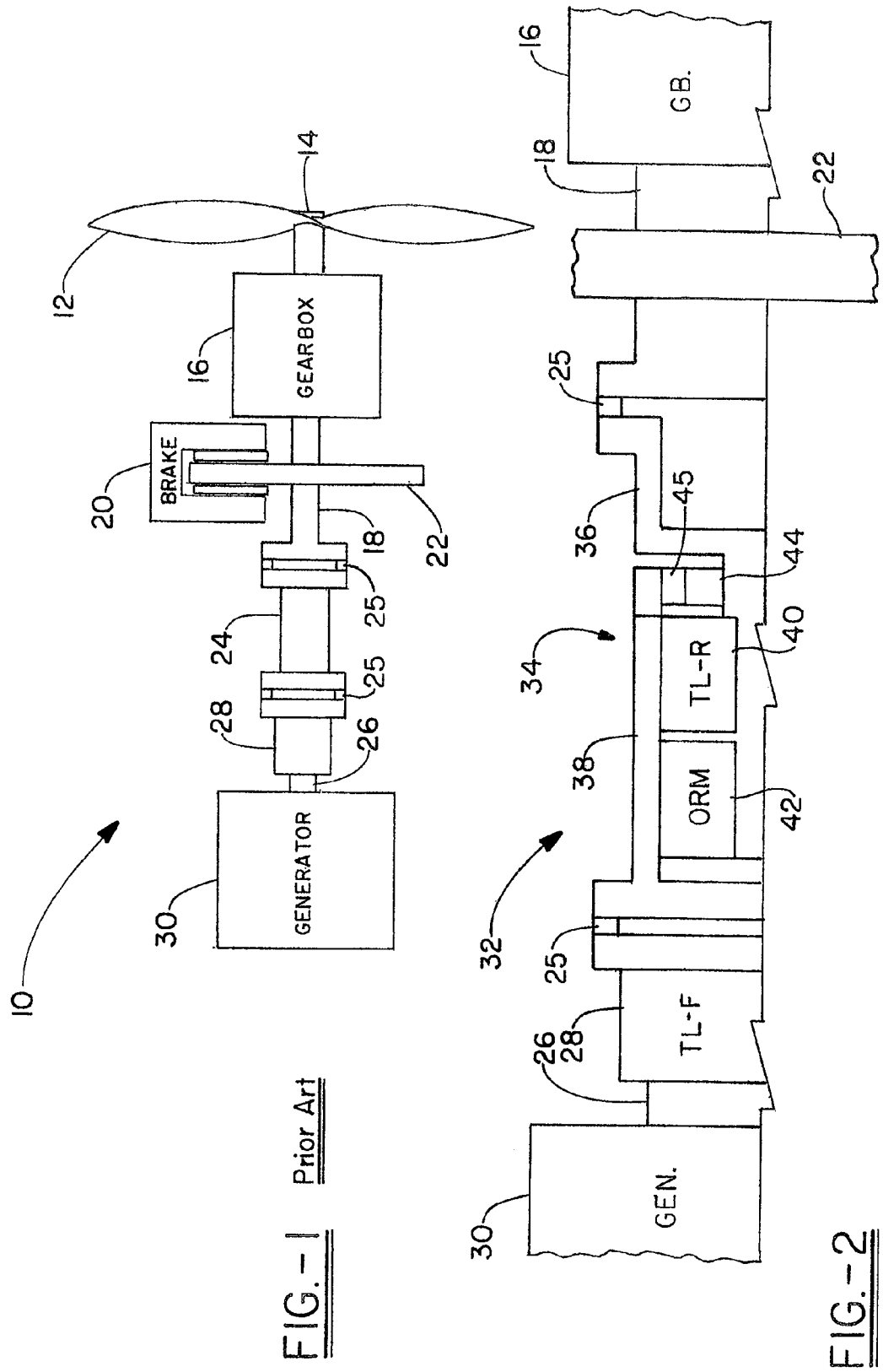

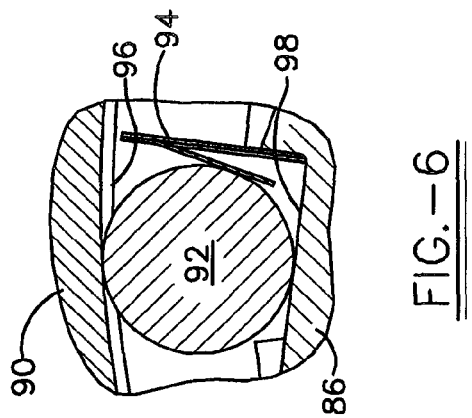
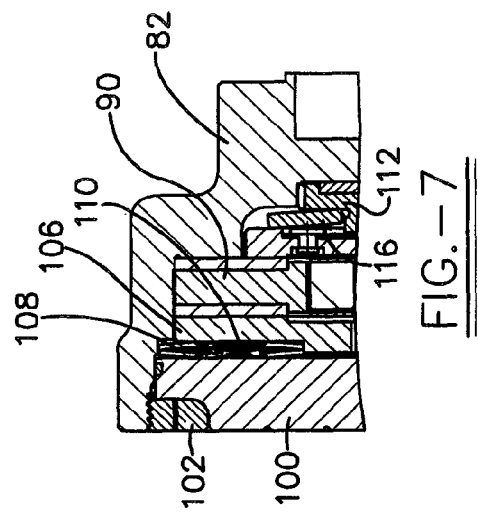
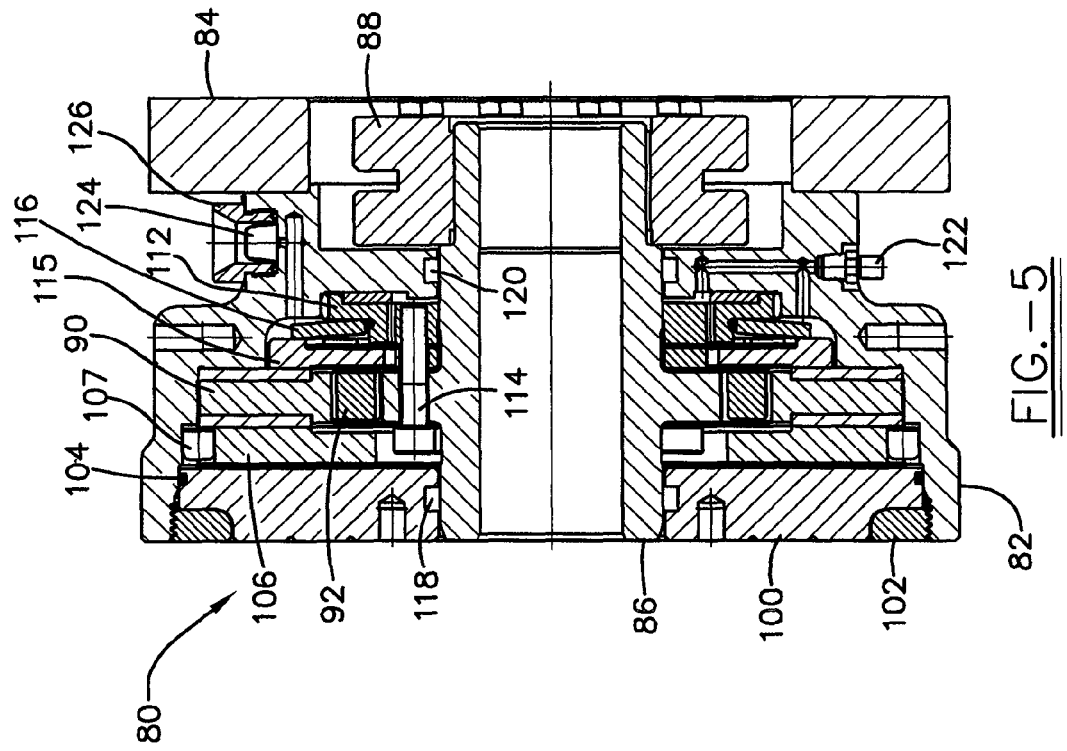

WIND TURBINE TORQUE LIMITING CLUTCH SYSTEM

CROSS-REFERENCE TO RELATED APPLICATIONS

This is a continuation-in-part of patent application Ser. No. 12/858,688, filed Aug. 18, 2010 now U.S. Pat. No. 8,932,017.

TECHNICAL FIELD

The invention herein resides in the art of power transmission devices and, more particularly, to torque limiting clutches for use in wind turbines. Specifically, the invention relates to a torque limiting clutch for protecting wind turbines from bearing and gear damage caused by torque reversals. The invention provides an asymmetric torque limiting coupling system for use on wind turbines, in which a forward torque limiting clutch and a reverse torque limiting clutch are provide in paired relation, with the reverse torque limiting clutch having a characteristic slip torque that is a fraction of that of the forward torque limiting clutch. The invention contemplates the provision of such an arrangement of torque limiting clutches as a retrofit to existing systems, or as original equipment.

BACKGROUND ART

Tens of thousands of wind turbines have been installed over the past decade, almost all using a similar drive system incorporating a gearbox as a speed increaser, positioned between the turbine blades and a generator. Gearboxes are typically designed with the intent and desire to ensure that the bearings and gears are suitably aligned to take their intended design loads. Those design loads are typically focused on the forward operating rotational direction. However, it has been found that high reverse torques can affect the life of the bearings and gears of the gearbox. During torque reversals, the gears and bearings become misaligned, causing highly concentrated loading on the contact surfaces. Even a moderate reverse torque spike can damage the misaligned bearings and gears. There are various operating conditions that induce high torsional vibrations in the drive train and gearbox, some of which can cause severe torque in the reverse drive direction. These conditions may arise (a) upon start up when the electric contactor engages the wind turbine generator to the grid; (b) during emergency braking; (c) during normal braking when the caliper brake engages; (d) during grid disconnect events; and (e) during any of various electrical faults and control malfunctions.

While gearboxes for wind turbines are typically designed for a 20 year bearing and gear life, it has been found that the average life of gearboxes in wind turbine designs is on the order of 7-11 years. The cost of gearbox replacement is extremely high, not only in direct costs, but in downtime, as well. Indeed, it is believed that premature gearbox failure in many wind turbine designs has been largely a consequence of reverse torque load, for which no effective protection has been provided. Many wind turbines have traditional friction torque limiting couplings, typically set at 150-200% of the rated torque of the wind turbine. These do not provide adequate protection for misaligned bearings and gears loaded in reverse. The present invention contemplates that an asymmetric torque limiter coupling system, with a high torque setting in the standard forward direction and a low torque setting in the reverse direction could significantly improve gearbox life.

DISCLOSURE OF THE INVENTION

In light of the foregoing, it is a first aspect of the invention to provide a wind turbine torque limiting clutch system in which gearbox protection is provide in both forward and reverse operating directions.

Another aspect of the invention is the provision of a wind turbine torque limiting clutch system in which bidirectional protection of an asymmetric nature is provided.

Yet a further aspect of the invention is the provision of a wind turbine torque limiting clutch system in which a reverse torque limiter is provided having a characteristic slip torque that is a fraction of that in the forward direction.

Still a further aspect of the invention is the provision of a wind turbine torque limiting clutch system in which the clutch mechanisms are enclosed, sealed and dry, and operative in an inert gas atmosphere.

Still another aspect of the invention is the provision of a wind turbine torque limiting clutch system including a system for monitoring the phase angle and slip between the blade shaft and generator shaft to assess the torques incident to the gearbox.

Yet a further aspect of the invention is the provision of a wind turbine torque limiting clutch system that is readily adaptable to existing wind turbines for enhanced operation and durability.

The foregoing and other aspects of the invention that will become apparent as the detailed description proceeds are achieved an the improvement in a wind turbine power generating system comprising a wind turbine connected to a speed increasing gearbox having a high speed output shaft and an electrical generator having an input shaft, the improvement comprising: a coupling system interconnecting said output and input shafts, said coupling system being asymmetrical, having a first characteristic slip torque in a first forward rotational drive direction, and a second characteristic slip torque in a second reverse rotational drive direction, said second characteristic slip torque being set at substantially zero.

Other aspects of the invention are attained by an asymmetric torque limiter to interconnect a wind turbine with a generator shaft, comprising: an input housing and an output hub; an over running mechanism interposed between said input housing and output hub; a first torque limiting mechanism in series interconnection with said over running mechanism between said input housing and output hub; and a second torque limiting mechanism in parallel interconnection with said over running mechanism between said input housing and output hub.

DESCRIPTION OF THE DRAWINGS

For a complete understanding of the various aspects and structures of the invention, reference should be made to the following detailed description and accompanying drawings wherein:

FIG. 1 is a functional schematic of a wind turbine generator according to the prior art;

FIG. 2 is a functional schematic of a first embodiment of the invention, particularly adapted as a retrofit to existing coupling systems that have a traditional torque limiter;

FIG. 5 is a cross sectional view of an asymmetrical torque limiting coupling adapted for implementation of the system of FIG. 4;

FIG. 6 is a partial sectional view of the ramp and roller one-way clutch mechanism of the embodiment of FIG. 5; and FIG. 7 is a partial sectional view of the adjustable spring-loaded mechanism forcefully engaging the pressure plate into a series-connected torque limiting mechanism of the invention of FIG. 5.

DETAILED DESCRIPTION AND PREFERRED EMBODIMENTS

Figure 3:
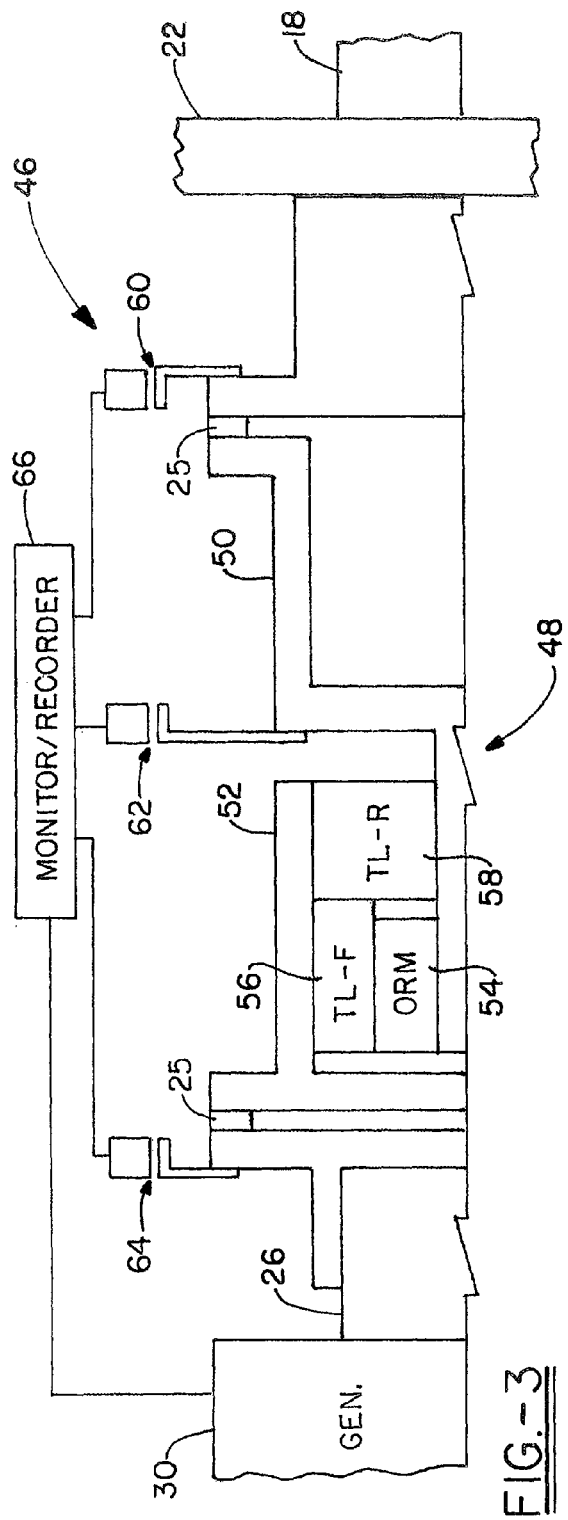
FIG. 3 is a functional schematic of a retrofit for wind turbine generators that previously included no torque limiter.

Referring now to the drawings and more particularly to FIG. 1, it can be seen that a wind turbine generating system made in accordance with acknowledged prior art is designated generally by the numeral 10. The system 10 includes a series of turbine blades 12 attached to a low speed turbine shaft 14. The turbine shaft 14 passes to a gearbox 16, which serves to greatly increase the rotational speed of the gearbox output shaft 18, in standard fashion. A caliper brake 20 is operative in association with a brake rotor 22, affixed to the gearbox shaft 18, to selectively stop rotation of the shaft 18, as readily appreciated by those skilled in the art. A coupling is interposed between the gearbox output shaft 18 and a generator shaft 26, as shown. Those skilled in the art will appreciate that the coupling comprises a coupling spacer 24 with flexing elements 25 adapted to accommodate misalignment between the shafts 18, 26.

A torque limiter or torque limiting clutch 28 is provided in association with the generator shaft 26 to isolate the gearbox output shaft 18 and connected gearbox 16 from excessive intermittent torque. Those skilled in the art will appreciate that the torque limiting clutch 28 will typically have a characteristic slip torque set at 1.2 to 2 times the nominal torque contemplated for application to the gearbox 16. In general, the torque limiting clutch 28 is set at 1.5 times such nominal torque. Those skilled in the art will appreciate that the torque limiting clutch 28 is typically bidirectional, operating with equal slip torque in both a clockwise and counterclockwise rotational mode. However, the characteristic slip torque limiter 28 is typically well in excess of that required for protection against reverse torque excursions.

As presented above, the design of the prior art wind turbine generating system 10, and associated torque limiting clutch 28, gave little thought to the presence of torque loads on misaligned bearings and gears in the reverse drive direction, such torque giving rise to gearbox damage and the necessity of early service and repair. The instant invention, shown in FIGS. 2-4 and described below, serves to remedy this problem by providing enhanced torque limiting protection against reverse loads.

With reference now to FIG. 2, it can be seen that a first embodiment of a wind turbine generating system made in accordance with the invention is designated generally by the numeral 32. This first embodiment is presented as a retrofit for a system presently employing a torque limiting clutch. As shown, a gearbox 16 has an output drive shaft 18 in operative communication with a caliper brake 20 and brake rotor 22. The gearbox shaft 18 is interconnected with the generator shaft 26 by means of a coupling spacer 34 and flexing elements 25. The coupling spacer 34 includes a pair of concentric overlapping hubs 36, 38, respectively interconnected with the shafts 18, 26. A first torque limiting clutch 28, typically having a slip torque of 1.2 to 2 times the nominal torque for the system 32 is interposed between the coupling spacer 34 and the generator shaft 26. The torque limiting clutch 28 is, in the embodiment of FIG. 2, a portion of the original equipment of the wind turbine generating system. To provide protection for reverse torque occurrences, the original coupling between the shafts 18, 26 is replaced with the coupling spacer 34 comprising hubs 36, 38 with a torque limiting clutch 40 in parallel with an over running mechanism 42. The overrunning mechanism 42 will typically comprise a one-way clutch, providing for direct interconnection between the hubs 36, 38 in a first rotational direction, and being freewheeling in the opposite direction. Accordingly, the torque limiting clutch 40 serves as a reverse torque limiting clutch, providing for interconnection between the hubs 36, 38 with a characteristic slip torque in the reverse rotational direction. In a preferred embodiment of the invention, the torque limiting clutch 40 has a characteristic slip torque that is a fraction of the nominal torque experienced by the torque limiting clutch 28.

As further shown in FIG. 2, seal 44 may be employed to provide a sealed enclosure and protect the coupling spacer 34, and particularly the torque limiting clutch 40 and the over running mechanism 42 from the environment. A dry environment is preferred. To further protect these elements from the environment, it is contemplated that the enclosure is slightly pressurized with an inert gas such as nitrogen. The presence of a pressurized interior may be indicated by an appropriate pressure indicator 45, such as a bladder or spring-biased rod.

In the normal forward drive direction, the wind turbine generating system 32 of FIG. 2 operates such that the gearbox shaft 18 drives the generator shaft 26 through the coupling spacer 34 in a first rotational direction. Protection is provided by means of the torque limiting clutch 28, interposed between the coupling spacer 34 and the generator shaft 26. In this direction of rotation, the overrunning mechanism or one-way clutch 42 provides direct interconnection between the hubs 36, 38.

In the event of a reverse torque situation, the one-way clutch 42 becomes freewheeling and the interconnection between the hubs 36, 38 is provided through the reverse torque limiting clutch 40. The characteristic slip torque of the torque limiting clutch 40 is less than that of the torque limiting clutch 28 and, accordingly, protection to the gearbox 16 for reverse load torques is provided by the reverse torque limiting clutch 40.

With reference now to FIG. 3, it can be seen that a second embodiment of a wind turbine generating system is designated generally by the numeral 46. The system 46 again provides a retrofit for an existing system by replacing the original coupling spacer with the coupling spacer 48. This modification is particularly adapted for systems that had no torque limiting clutch provision. Accordingly, the coupling spacer 48, provided between the gearbox shaft 18 and generator shaft 26 includes a pair of hubs 50, 52 with torque limiting interconnections interposed therebetween. Again, an overrunning mechanism or one-way clutch 54 is provided in series connection with the torque limiting clutch 56, rendering the torque limiter 56 a forward torque limiting clutch, with the one-way clutch 54 being freewheeling in the opposite direction. A reverse torque limiting clutch 58 is interposed between the hubs 50, 52 in parallel with the interconnection between the one-way clutch 54 and forward torque limiting clutch 56. Again, the characteristic slip torque of the torque limiting clutch 58 is but a fraction of that of the torque limiting clutch 56. Accordingly, the one-way clutch 54 ensures that the torque limiting clutch 56 controls forward torque applications, while the torque limiting clutch 58 controls reverse torque incidents.

The instant invention further contemplates the utilization of monitoring and recording apparatus for assessing slip and torque between the various elements of the wind turbine generating system. In the embodiment of FIG. 3, variable reluctance magnetic sensors or transducers 60, 62, 64 are positioned in association with the gearbox shaft 18 (transducer 60), hub 50 (transducer 62), and generator shaft 26 (transducer 64). Each of the transducers 60, 62, 64 provides an output corresponding to rotational movement of the associated element 18, 50, 26. Accordingly, the slip and torque experienced along the power transmission drive 18, 48, 26 may be continually monitored by means of the monitor/recorder 66. As shown, the output of the generator 30 may also be so recorded.

Those skilled in the art will appreciate that not only the rotational speed of the various elements may be measured, but also the phase angle between such elements. For example, those skilled in the art will appreciate that the phase angle difference between the transducer 60 and the transducer 62 is an indication of the characteristic torsional wind up between the transducers, thus translatable to the torque in the coupling system. When the transducers 60, 62 provide signals that are in phase-lock correspondence with each other, there is no torque imparted to the shaft 18. Similarly, the differences in rotational speed monitored between the transducers 60 and 64 or 62 and 64 are indicative of any instantaneous slip between the elements with which the transducers are associated. The monitor/recorder 66 can thus obtain data regarding the torque and slip characteristics of the transmission shafts and their coupling in the wind turbine generating system 46.

Figure 4:
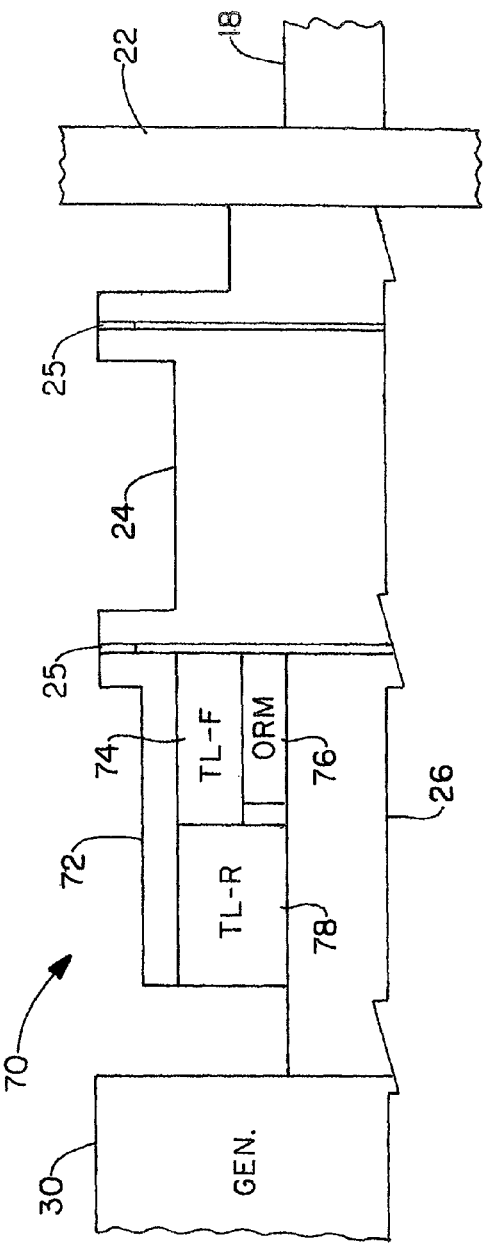
FIG. 4 is a functional schematic of a wind turbine generator having an asymmetrical torque limiting coupling according to the invention, and implemented as original equipment.

With reference now to FIG. 4, it can be seen that an original equipment wind turbine generating system made in accordance with the invention is designated generally by the numeral 70. Here again, a gearbox 16 has an output shaft 18 interconnected through the coupling spacer 24 and flexing elements 25 to a hub 72 which is in operative driving communication with the generator shaft 26 of the generator 30. In an original equipment embodiment of the invention, a torque limiter 74, serving as a forward torque limiter, is interconnected in series with a one-way clutch or overrunning mechanism 76 to interconnect the hub 72 with the generator shaft 26. In parallel with this arrangement, and further interconnecting the hub 72 with the generator shaft 26, is a torque limiting clutch 78 which, as with the embodiment of FIG. 3, operates to provide torque limiting capabilities for oppositely directed rotation from that of the torque limiting clutch 74. This reverse torque limiter 78 has a characteristic slip torque that is a fraction of the that of the forward torque limiting clutch 74. Again, the operation is the same, as discussed above.

It is contemplated that the various embodiments of the invention will typically have a forward operating torque limiting clutch having a characteristic slip torque of 1.2 to 2 times the nominal torque experienced by the system, and most preferably on the order of 1.5 times such torque. The reverse torque limiting clutch will typically have a characteristic slip torque less than that of the forward torque limiting clutch. It is further contemplated that the torque limiting clutch of the invention may include multiple disk clutches, as are well known and understood by those skilled in the art. Of course, the size and number of such disks will typically be determined by reactionary force needs, with due consideration being given to packaging constraints. As presented above, the invention further contemplates that the torque limiting clutches of the invention, as well as the over running mechanism will typically be housed in an inert gas environment, with the inert gas being under pressure greater than that of atmosphere, ensuring protection from the environment. Indeed, according to a preferred embodiment of the invention, a nitrogen filled housing is contemplated.

The monitor/recorder 66 of the invention is contemplated for use in recording and logging excessive torque and/or torque slip events. The transducers 60, 62, 64 may be of any suitable nature, but are presently contemplated as being variable reluctance metallic ring transducers with spaced teeth inducing signals corresponding to rotational speed and position. Signal differences are an indication of torque and/or slippage, as will be appreciated by the skilled artisan.

The instant invention, in contradistinction to the prior art, seeks to protect the gearbox of wind turbine generating systems from the harmful effects of the reverse torques periodically impacting the gearbox of such systems. By providing the asymmetrical torque limiting couplings presented and described above, with the forward and reverse torque limiters being independently operative and of different settings, protection of gearboxes is ensured.

Referring now to FIG. 5, an appreciation can be obtained with regard to a particular embodiment of an asymmetrical torque limiting coupling for wind turbine power generation made in accordance with the invention the same being designated generally by the numeral 80. The asymmetrical torque limited coupling 80 includes an input housing 82 which, consistent with the embodiment of FIG. 4, is connected to a high speed shaft of a wind turbine gearbox as by an adaptor plate 84. The adaptor plate 84 may be bolted or otherwise affixed to the input housing 82. An output hub 86 is adapted to receive and secure a generator shaft or the like by means of an appropriate key or spline engagement or, preferably, a shrink disk connector 88. The torque limiting mechanisms of the asymmetrical torque limiting coupling 80 are maintained within and interposed between the input housing 82 and output hub 86, as more particularly presented below.

A friction plate assembly 90, with friction material on opposite faces thereof, operates as a one-way clutch or over running mechanism by virtue of a plurality of cylindrical rollers 92 interposed between and circumferentially spaced about the output hub 86 and friction plate assembly 90. As best shown in FIG. 6, the one-way clutch of the friction plate assembly 90 is a ramp and roller clutch in which each of the cylindrical rollers 92 has an associated spring 94 urging the roller into engagement between the arched race 96 of the inner surface of the friction plate assembly 90 and a ramp 98 defining an inner surface of the output hub 86. Those skilled in the art will appreciate that, in one direction of rotation, the cylindrical rollers 92 lock the friction plate assembly 90 and output hub 86, while in an opposite direction of rotation, the friction plate assembly 90 is substantially freewheeling. It will be appreciated that the over running mechanism 90-98, just described, is preferably of a zero backlash sprag or zero backlash ramp and roller design to accommodate reliable operation and reduced wear in the disclosed asymmetrical design. Notably, the friction plate 90 is clamped by springs 108, 110 to the input housing 82.

With reference again to FIG. 5, it will be seen that an end plate 100 is secured in place by a lock ring or retaining nut 102 in threaded engagement with the input housing 82. A seal 104 is interposed between the input housing 82 and the end plate 100.

A pressure plate 106 is pinned as at 107 to the input housing 82. As best shown in FIG. 7, disk springs 108 and stacked wave springs 110 are interposed between the end plate 100 and pressure plate 106, urging the pressure plate 106 into engagement with the friction plate 90. The disk springs 108 and stacked wave springs 110 may include multiple stacks of Belleville washers or springs to accommodate major spring force and torque adjustment—the latter being achieved by varying the composition of the spring stack. Additionally, the Belleville spring of each stack is centered by an inner wave spring. Further, the lock ring or retaining nut 102 is in adjustable threaded engagement with the input housing 82 to finely set a desired spring compression and characteristic torque through urging of the end plate 100 toward the pressure plate 106.

As best shown in FIG. 5, the friction plate assembly 112 is rotationally fixed to the output hub 86 by means of a cap screw 114. A flex plate assembly 115 is similarly fixed and interposed between the friction plate assemblies 90 and 112, with a Belleville spring 116 interposed between the friction plate assembly 112 and flex plate assembly 115 and urging the friction surfaces into contact with the input housing 82. This arrangement causes the input housing 82 to remain stable and square with the output hub 86.

It will be appreciated that the elements 90-98 function as a one-way clutch or over running mechanism, the elements 90, 106-110 comprise a first friction torque limiting mechanism, while the elements 112-116 comprise a second friction torque limiting mechanism. This second friction torque limiting mechanism demonstrates the same amount of torque in both a forward and reverse rotating direction, with that torque setting being substantially less than the characteristic torque of the first friction torque limiting mechanism of the elements 90, 106-110. Indeed, the second friction torque limiting mechanism may have a characteristic torque set at or near zero. Further, the spring force of the second torque limiting mechanism is desirably less than the first torque limiting mechanism to ensure that the friction plate assembly 90 is held stable to the output hub 86 as the force of the Belleville spring 116 is acting on the flex plate assembly 115 with the same force as against the friction plate assembly 90 in the opposite direction.

In the context of the operation of the asymmetrical torque limiting coupling 80, consistent with the concepts of the invention presented in FIGS. 2-4, it will be appreciated that the friction plate assembly 90 and output hub 86 are in series interconnection through the one-way or ramp and roller clutch. The friction plate assembly 90 and the friction plate assembly 112 are in parallel with each other, with the friction plate assembly 90 controlling forward operation. In reverse operation, the friction plate assembly 112 and friction flex plate assembly 115 control operations since the one-way clutch structure of FIG. 6 renders the friction plate assembly 90 substantially inconsequential in the reverse direction.

It has been found to be very important for asymmetric torque limiters that they not add additional backlash to the drive system, since backlash in gearing adds to the problems experienced in wind turbine drive systems. The design of both the series and parallel torque limiting mechanisms described above, and the overrunning mechanism of the ramp and roller clutch all achieve zero backlash.

A further feature of an embodiment of the invention is the maintenance of the torque limiting mechanisms within a positive inert gas atmosphere. To this end, in addition to the seal 104, a seal 118 is interposed between the end plate 100 and output hub 86, and a seal 120 is interposed between the input housing 82 and output hub 86. With these seals provided between the input housing 82 and output hub 86, a Schrader valve 122 provides for introduction of inert gas, at an appropriate pressure, within the cavity defined therebetween. In a preferred embodiment, the inert gas is argon. A diaphragm 124 is provided within a diaphragm housing 126 to allow monitoring of the internal pressure.

Thus it can be seen that the various aspects of the invention have been satisfied by the structure presented above. While in accordance with the patent statutes only the best mode and preferred embodiments of the invention have been presented and described in detail, the invention is not limited thereto or thereby. Accordingly, for an appreciation of the scope and breadth of the invention reference should be made to the following claims.

What is claimed is:

1. An asymmetric torque limiter to interconnect a wind turbine with a generator shaft, comprising:
   an input housing and an output hub;
   an over running mechanism interposed between said input housing and output hub;
   a first torque limiting mechanism positioned in series interconnection with said over running mechanism between said input housing and output hub;
   a second torque limiting mechanism positioned in parallel interconnection with said over running mechanism between said input housing and output hub; and
   wherein said first torque limiting mechanism comprises a friction plate assembly, and wherein said over running mechanism is maintained about an inner circumference of said friction plate assembly and interfaces with said output hub, and further comprising an end plate sealed between said input housing and output hub, a pressure plate, and a spring assembly interposed between said end plate and pressure plate, said spring assembly forcing said pressure plate into contacting engagement with said friction plate assembly.

2. The asymmetric torque limiter according to claim 1, wherein said input housing is further sealed about said output hub.

3. The asymmetric torque limiter according to claim 2, wherein said input housing and output hub define a cavity, said cavity being filled with an inert gas.

4. The asymmetric torque limiter according to claim 3, wherein said inert gas is pressurized within said cavity, and further comprising a sealed pressure indicator in communication with said cavity, and viewable from outside said input housing.

5. The asymmetric torque limiter according to claim 4, wherein said indicator comprises a diaphragm.

6. The asymmetric torque limiter according to claim 3, wherein said inert gas is argon.

7. The asymmetric torque limiter according to claim 1, wherein said over running mechanism comprises a zero backlash spring-biased ramp and roller interface with said output hub.

8. The asymmetric torque limiter according to claim 1, wherein said over running mechanism comprises a zero backlash sprag.

9. The asymmetric torque limiter according to claim 1, wherein an input to said over running mechanism comprises said first torque limiting mechanism clamped by springs to said input housing.

10. The asymmetric torque limiter according to claim 1, wherein the total forward torque setting of the asymmetrical torque limiter is a torque setting of said first torque limiting mechanism and at least a portion of a torque setting of said second torque limiting mechanism, and a reverse torque setting of the asymmetrical torque limiter is only said torque setting of said second torque limiting mechanism.

11. An asymmetric torque limiter to interconnect a wind turbine with a generator shaft, comprising:
    an input housing and an output hub;

an over running mechanism interposed between said input housing and output hub;

a first torque limiting mechanism positioned in series interconnection with said over running mechanism between said input housing and output hub;

a second torque limiting mechanism positioned in parallel interconnection with said over running mechanism between said input housing and output hub; and wherein said first torque limiting mechanism comprises a friction plate assembly, and wherein said over running mechanism is maintained about an inner circumference of said friction plate assembly and interfaces with said output hub, and further comprising an end plate, a pressure plate, and a spring assembly interposed between said end plate and pressure plate, said spring assembly forcing said pressure plate into contacting engagement with said friction plate assembly, and a locking ring adjustably threadedly engaging said input housing and urging said end plate into selective compressive engagement with said spring assembly, thereby providing torque setting adjustment.

12. The asymmetric torque limiter according to claim 11, wherein said spring assembly comprises multiple stacks of Belleville springs, a selected number of stacks providing for major spring force and torque setting selection.

13. The asymmetric torque limiter according to claim 12, wherein each stack of Belleville springs is centered by an inner wave spring.

14. An asymmetric torque limiter to interconnect a wind turbine with a generator shaft, comprising:

an input housing and an output hub;

an over running mechanism interposed between said input housing and output hub;

a first torque limiting mechanism positioned in series interconnection with said over running mechanism between said input housing and output hub, said first torque limiting mechanism being clamped by springs to said input housing and comprising an input to said over running mechanism;

a second torque limiting mechanism positioned in parallel interconnection with said over running mechanism between said input housing and output hub; and wherein said first torque limiting mechanism comprises a friction plate assembly, and wherein said over running mechanism is maintained about an inner circumference of said friction plate assembly and interfaces with said output hub, and further comprising an end plate, a pressure plate, and a spring assembly interposed between said end plate and pressure plate, said spring assembly forcing said pressure plate into contacting engagement with said friction plate assembly.

\* \* \* \* \*